(12) United States Patent
Elms et al.

(10) Patent No.: US 6,707,651 B2
(45) Date of Patent: Mar. 16, 2004

(54) ARC FAULT OR GROUND FAULT OR ARC FAULT/GROUND FAULT TRIP SIGNAL GENERATOR AND TRIP UNIT EMPLOYING THE SAME

(75) Inventors: Robert T. Elms, Monroeville, PA (US); Theodore J. Miller, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 102 days.

(21) Appl. No.: 10/160,912

(22) Filed: Jun. 3, 2002

(65) Prior Publication Data

US 2003/0223161 A1 Dec. 4, 2003

(51) Int. Cl.$^7$ .................................................. H02H 3/16
(52) U.S. Cl. ....................................................... 361/42
(58) Field of Search ............................... 361/42, 43, 44, 361/45, 46, 47, 49, 50

(56) References Cited

U.S. PATENT DOCUMENTS

| | | |
|---|---|---|
| 5,224,006 A | 6/1993 | MacKenzie et al. |
| 5,260,676 A | 11/1993 | Patel et al. |
| 5,293,522 A | 3/1994 | Fello et al. |
| 5,459,630 A | 10/1995 | MacKenzie et al. |
| 5,691,869 A | 11/1997 | Engel et al. |
| 5,889,643 A | 3/1999 | Elms |
| 5,969,920 A | 10/1999 | MacKenzie |
| 6,014,297 A * | 1/2000 | Clarey et al. .................. 361/42 |
| 6,504,692 B1 * | 1/2003 | Macbeth et al. ............... 361/42 |

* cited by examiner

Primary Examiner—Brian Sircus
Assistant Examiner—Boris Benenson
(74) Attorney, Agent, or Firm—Martin J. Moran (57) ABSTRACT

A trip signal generator for an arc fault or ground fault trip unit includes two inputs electrically interconnected with the two outputs of arc fault and ground fault detection circuits. A second input is electrically interconnected with an anode of a semiconductor switching device, such as a triac or SCR, which drives a trip coil of a trip solenoid. A circuit monitors the outputs of a power supply and provides an output when the outputs of the power supply are operational. A trip logic circuit drives a gate of the semiconductor switching device when the outputs of the power supply are operational, when one of the two first inputs is active, and when the second input is inactive.

29 Claims, 7 Drawing Sheets

ARC FAULT OR GROUND FAULT OR ARC FAULT/GROUND FAULT TRIP SIGNAL GENERATOR AND TRIP UNIT EMPLOYING THE SAME

BACKGROUND OF THE INVENTION

1. Field of the Invention

This invention relates to circuit interrupters including ground fault and/or arc fault trip mechanisms and, more particularly, to electronic trip units for circuit breakers and, more particularly, to such trip units, which respond to ground faults and sputtering arc faults. The invention also relates to trip signal generators for such trip units.

2. Background Information

Circuit interrupters include, for example, circuit breakers, contactors, motor starters, motor controllers, other load controllers and receptacles having a trip mechanism. Circuit breakers are generally old and well known in the art. Examples of circuit breakers are disclosed in U.S. Pat. Nos. 5,260,676; and 5,293,522.

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which is heated and bends in response to a persistent overcurrent condition. The bimetal, in turn, unlatches a spring powered operating mechanism, which opens the separable contacts of the circuit breaker to interrupt current flow in the protected power system. An armature, which is attracted by the sizable magnetic forces generated by a short circuit or fault, also unlatches, or trips, the operating mechanism.

In many applications, the miniature circuit breaker also provides ground fault protection. Typically, an electronic circuit detects leakage of current to ground and generates a ground fault trip signal. This trip signal energizes a shunt trip solenoid, which unlatches the operating mechanism, typically through actuation of the thermal-magnetic trip device.

A common type of ground fault detection circuit is the dormant oscillator detector including first and second sensor coils. The line and neutral conductors of the protected circuit pass through the first sensor coil. The output of this coil is applied through a coupling capacitor to an operational amplifier followed by a window comparator having two reference values. A line-to-ground fault causes the magnitude of the amplified signal to exceed the magnitude of the reference values and, thus, generates a trip signal. At least the neutral conductor of the protected circuit passes through the second sensor coil. A neutral-to-ground fault couples the two detector coils which causes the amplifier to oscillate, thereby resulting in the generation of the trip signal. See, for example, U.S. Pat. Nos. 5,260,676; and 5,293,522.

Recently, there has been considerable interest in also providing protection against arc faults. Arc faults are intermittent high impedance faults which can be caused, for instance, by worn insulation between adjacent conductors, by exposed ends between broken conductors, by faulty connections, and in other situations where conducting elements are in close proximity. Because of their intermittent and high impedance nature, arc faults do not generate currents of either sufficient instantaneous magnitude or sufficient average RMS current to trip the conventional circuit interrupter. Even so, the arcs can cause damage or start a fire if they occur near combustible material. It is not practical to simply lower the pick-up currents on conventional circuit breakers, as there are many typical loads, which draw similar currents and would, therefore, cause nuisance trips. Consequently, separate electrical circuits have been developed for responding to arc faults. See, for example, U.S. Pat. Nos. 5,224,006; and 5,691,869.

Circuit interrupters, such as circuit breakers designed for arc fault applications including 5 mA ground fault protection (e.g., Underwriters Laboratory (UL) Standard UL 943) must be able to trip in either of the positive or negative half cycles in order to meet the requisite UL 943 trip times. This requires the use of a switching device, such as a triac, which has a gate drive requirement of at least about 3 mA. This, however, requires more power on a continuous basis than is practically available in a low cost product.

Integrated circuits (ICs) designed for ground fault and/or arc fault detection and protection produce a constant trip output when the trip condition is satisfied. This is acceptable when an SCR is used as the trip device because SCRs can be activated with a gate current of less than about 200 $\mu$A. Moreover, miniature arc fault, ground fault, and/or arc fault/ground fault protection circuits in residential circuit breakers may need to operate with as little as about 3 mA of available DC power supply current. However, when a triac is employed (e.g., in order to meet the trip time requirements of the UL 943 standard), then higher levels of gate current are required in order to activate that device (e.g., about 5 mA, which is well above what current is available).

Expensive external circuits can be made to provide gate current only when the triac is in the OFF state. One arc fault/ground fault product requires significant and expensive external components to convert a continuous trip signal into a gated triac gate drive signal.

Figure 1:
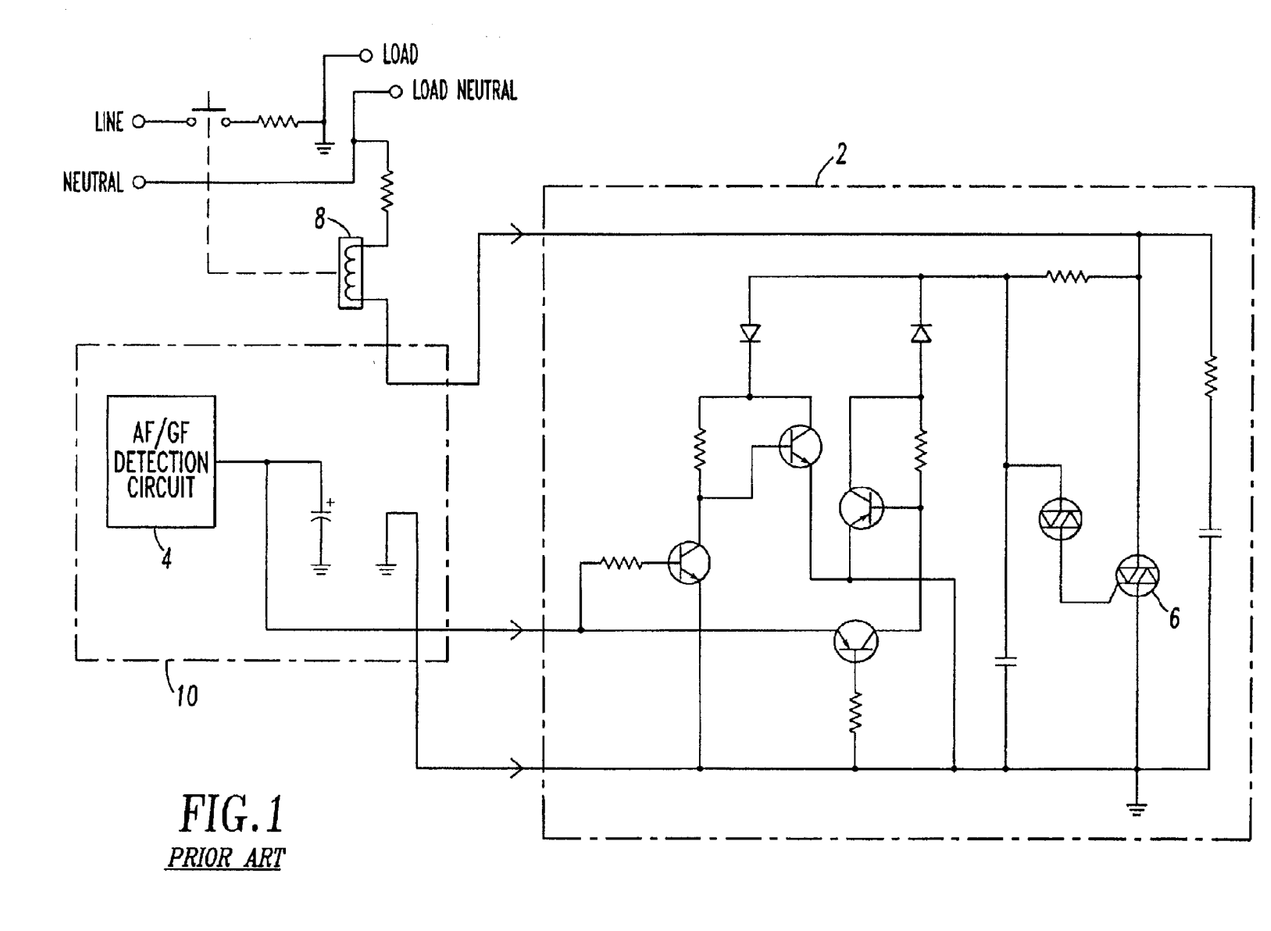
FIG. 1 is a block diagram, in schematic form, of a bi-directional trip circuit, which supplements the gate trigger current and drives a triac that drives a trip solenoid.

FIG. 1 is a block diagram, in schematic form, of a bi-directional trip circuit 2. The circuit 2 uses the gate trigger current from an arc fault/ground fault (AF/GF) detection circuit 4 to control a gate drive trigger circuit for triac 6. The triac 6, in turn, drives a trip solenoid coil 8. The circuit 2 is implemented as a daughter board for a main trip unit circuit board 10.

Accordingly, there is room for improvement in trip units and trip signal generators for arc fault and/or ground fault circuit interrupters.

SUMMARY OF THE INVENTION

These needs and others are met by the present invention. A trip signal generator for arc fault, ground fault and/or arc fault/ground fault circuit interrupters disables tripping until arc fault and/or ground fault detection circuits are fully operational, and then only generates a trip signal if a trip request is active and only if a semiconductor switching device is not active (i.e., is in the OFF state). This trip signal generator may generate suitably high gate drive signals of about 5 mA for a triac or 200 $\mu$A for an SCR, while operating with an average available power supply current of less than about 2 mA.

As one aspect of the invention, a trip unit for an arc fault or ground fault circuit breaker comprises: a trip actuator having a trip coil; a semiconductor switching device driving the trip coil, with the semiconductor switching device including a gate and an output electrically interconnected with the trip coil; an arc fault or ground fault detection circuit including at least one output having an arc fault or ground fault detection signal; a power supply having an output; and a trip signal generator comprising: at least one first input electrically interconnected with the at least one output of the arc fault or ground fault detection circuit, a second input electrically interconnected with the output of the semiconductor switching device, a power supply monitor monitoring the output of the power supply and having an output, and a circuit having an output electrically interconnected with the gate of the semiconductor switching device, the circuit comprising: a first switch controlled by the second input and electrically interconnected with the output of the semiconductor switching device, the first switch having an output, a second switch controlled by the output of the first switch and powered from the output of the power supply monitor, the second switch having an output, a third switch controlled by the output of the second switch, the third switch powered from the output of the power supply, the third switch having the output electrically interconnected with the gate of the semiconductor switching device, and at least one fourth switch controlled by the at least one first input electrically interconnected with the at least one output of the arc fault or ground fault detection circuit, the at least one fourth switch enabling the third switch.

The output of the circuit may be electrically interconnected with the gate of a triac, and may be electrically interconnected with the gate of the triac by a resistor. The output of the circuit may source a current of at least about 5 mA to the gate of the triac through the resistor.

The trip signal generator may be an integrated circuit, such as a bipolar integrated circuit.

As another aspect of the invention, a trip signal generator for an arc fault or ground fault trip unit comprises at least one first input electrically interconnected with at least one output of an arc fault or ground fault detection circuit, a second input electrically interconnected with an output of a semiconductor switching device, which drives a trip coil of a trip actuator, with the semiconductor switching device including a gate and an output electrically interconnected with the trip coil, a power supply monitor monitoring an output of a power supply, the power supply monitor having an output, and a circuit having an output electrically interconnected with a gate of the semiconductor switching device, the circuit comprising: a first switch controlled by the second input and electrically interconnected with the output of the semiconductor switching device, with the first switch having an output, a second switch controlled by the output of the first switch and powered from the output of the power supply monitor, with the second switch having an output, a third switch controlled by the output of the second switch and powered from the output of the power supply, with the third switch having the output electrically interconnected with the gate of the semiconductor switching device, and at least one fourth switch controlled by the at least one first input electrically interconnected with the at least one output of the arc fault or ground fault detection circuit, with the at least one fourth switch enabling the third switch.

As another aspect of the invention, a trip signal generator for an arc fault or ground fault trip unit comprises at least one first input electrically interconnected with at least one output of an arc fault or ground fault detection circuit; a second input electrically interconnected with an anode of a semiconductor switching device, which drives a trip actuator; means for monitoring an output of a power supply and providing an output when the output of the power supply is operational; and means for driving a gate of the semiconductor switching device when the output of the power supply is operational, when the at least one first input is active, and when the second input is inactive.

The second input may be structured for electrical interconnection with the anode of a triac; and the means for driving the gate of the triac may generate a gate drive signal of about 5 mA. The trip signal generator may be structured for operation with an average current from the power supply of less than about 2 mA.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is disclosed in connection with a bipolar arc fault/ground fault Application Specific Integrated Circuit (ASIC) 20, although it is to be understood that the invention applies to an arc fault and/or ground fault circuit implemented as part of any suitable circuit or integrated circuit (e.g., without limitation, CMOS).

As employed herein, a semiconductor switching device includes, but is not limited to, a triac, an SCR, and a MOSFET having a series diode.

Figure 2A:
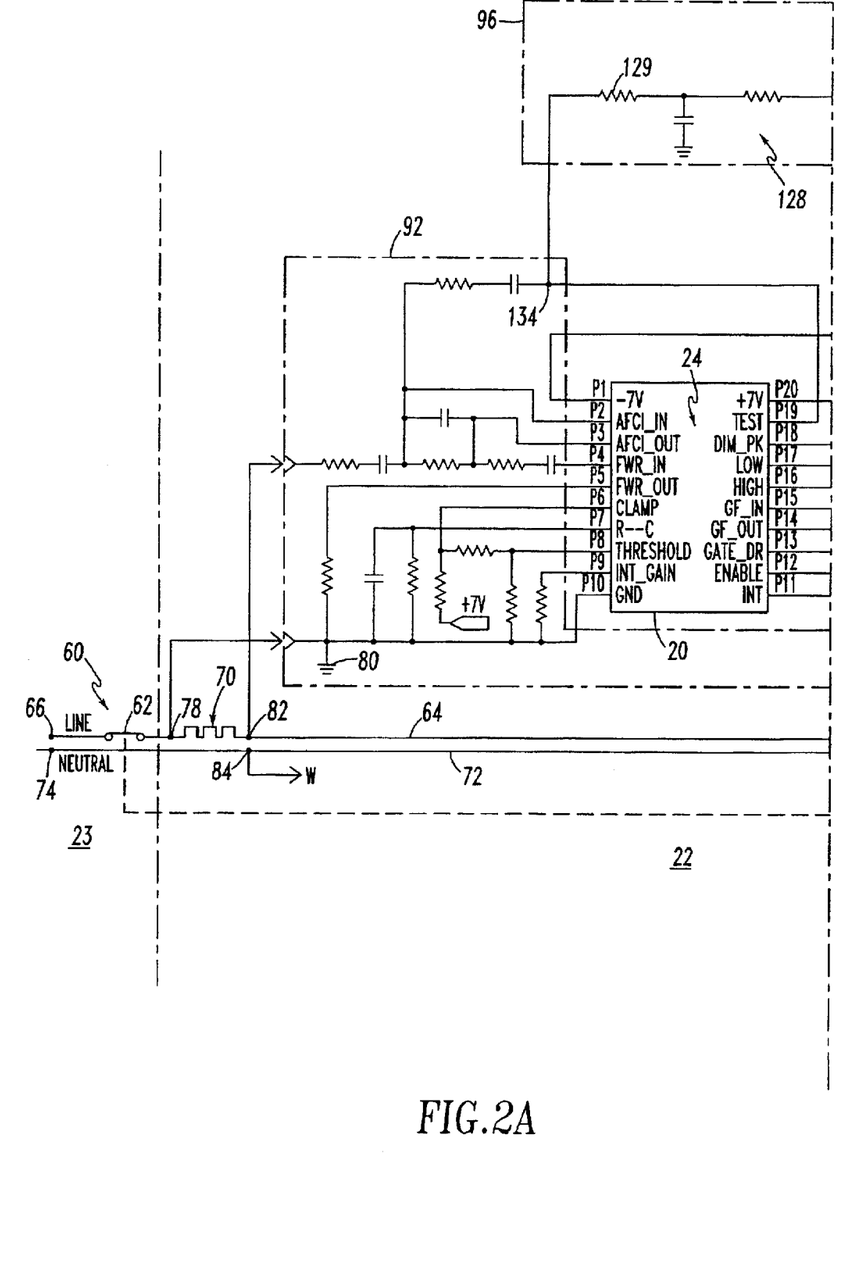
FIGS. 2A–2B form a block diagram, in schematic form, of a trip unit including an integrated circuit in accordance with the present invention.
Figure 2B:
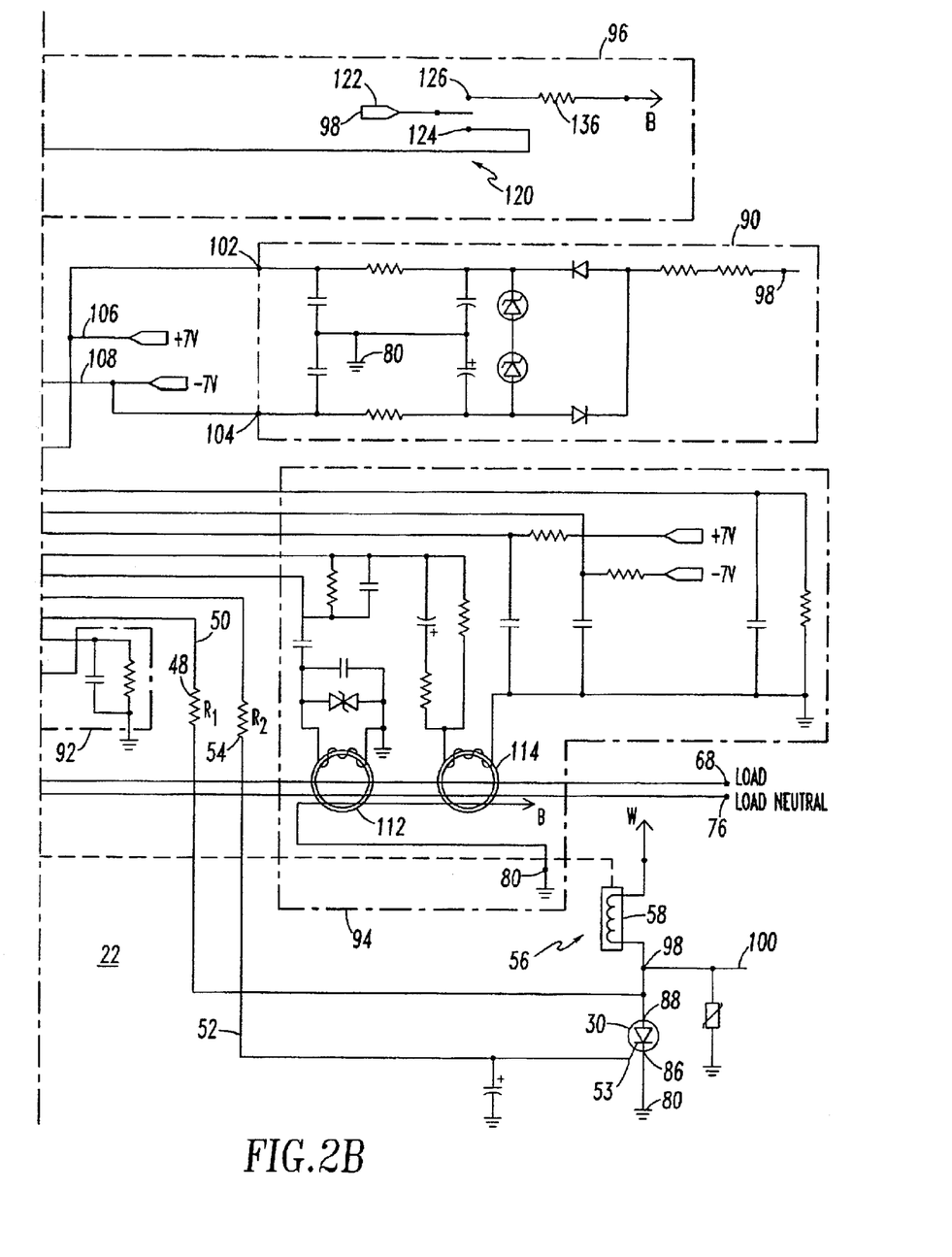
Figure 3:
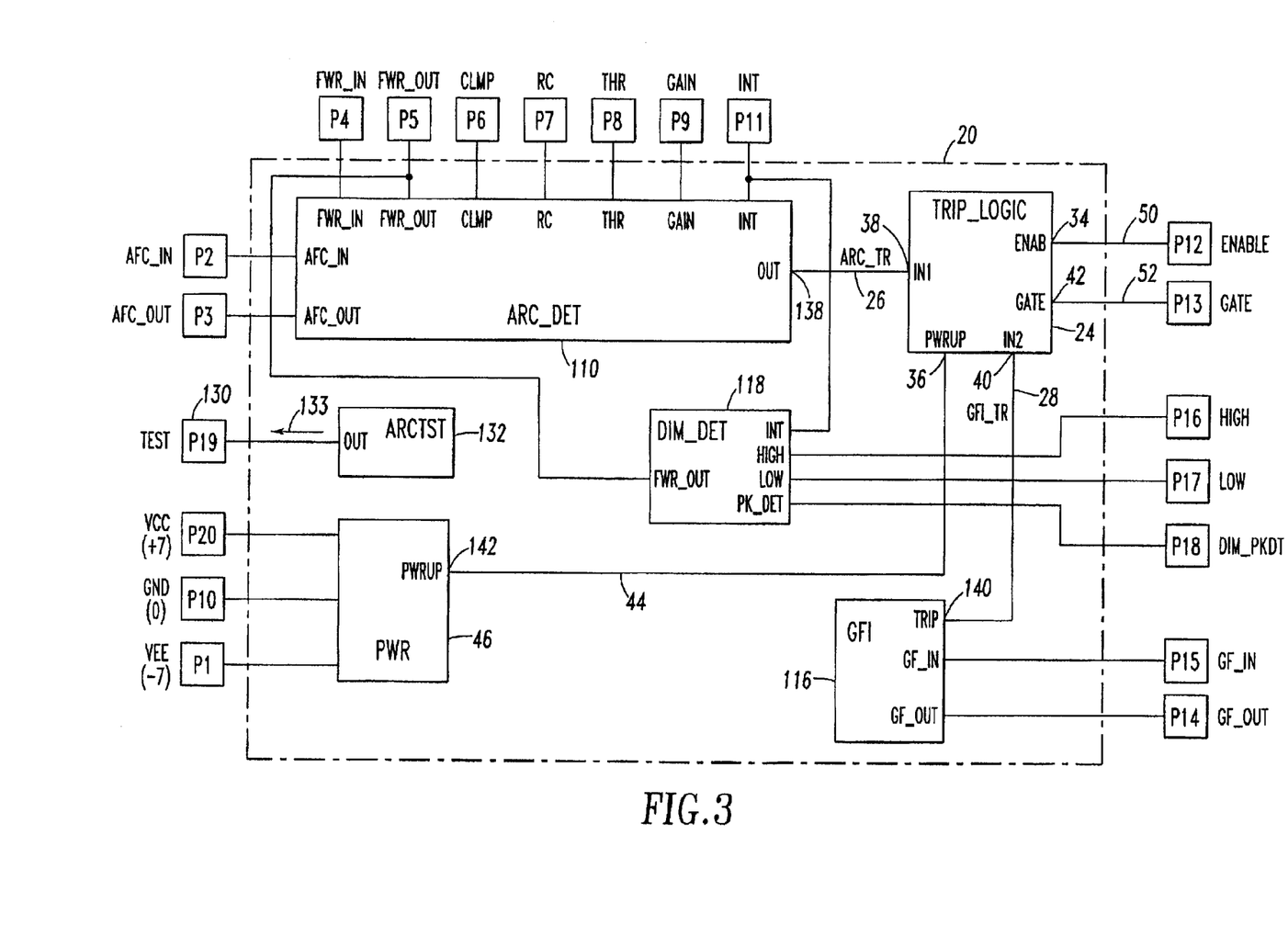
FIG. 3 is a block diagram of the integrated circuit of FIG. 2A.
Figure 4:
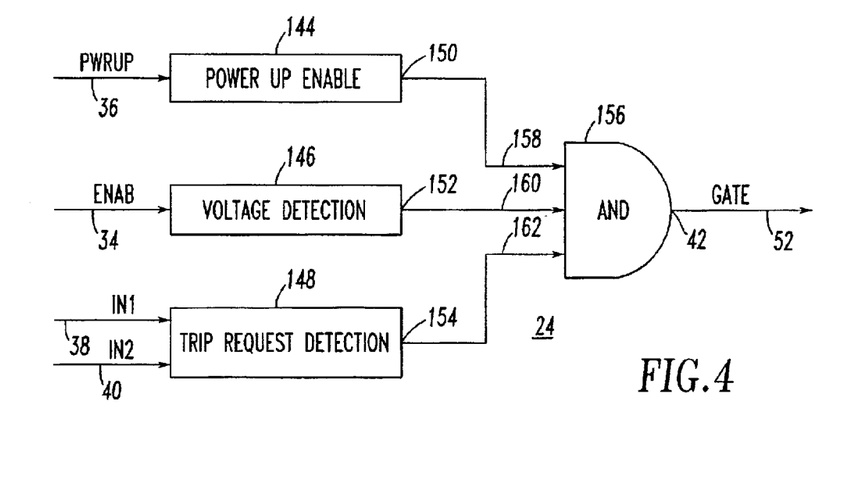
FIG. 4 is a block diagram of the trip logic of FIG. 3.
Figure 5:
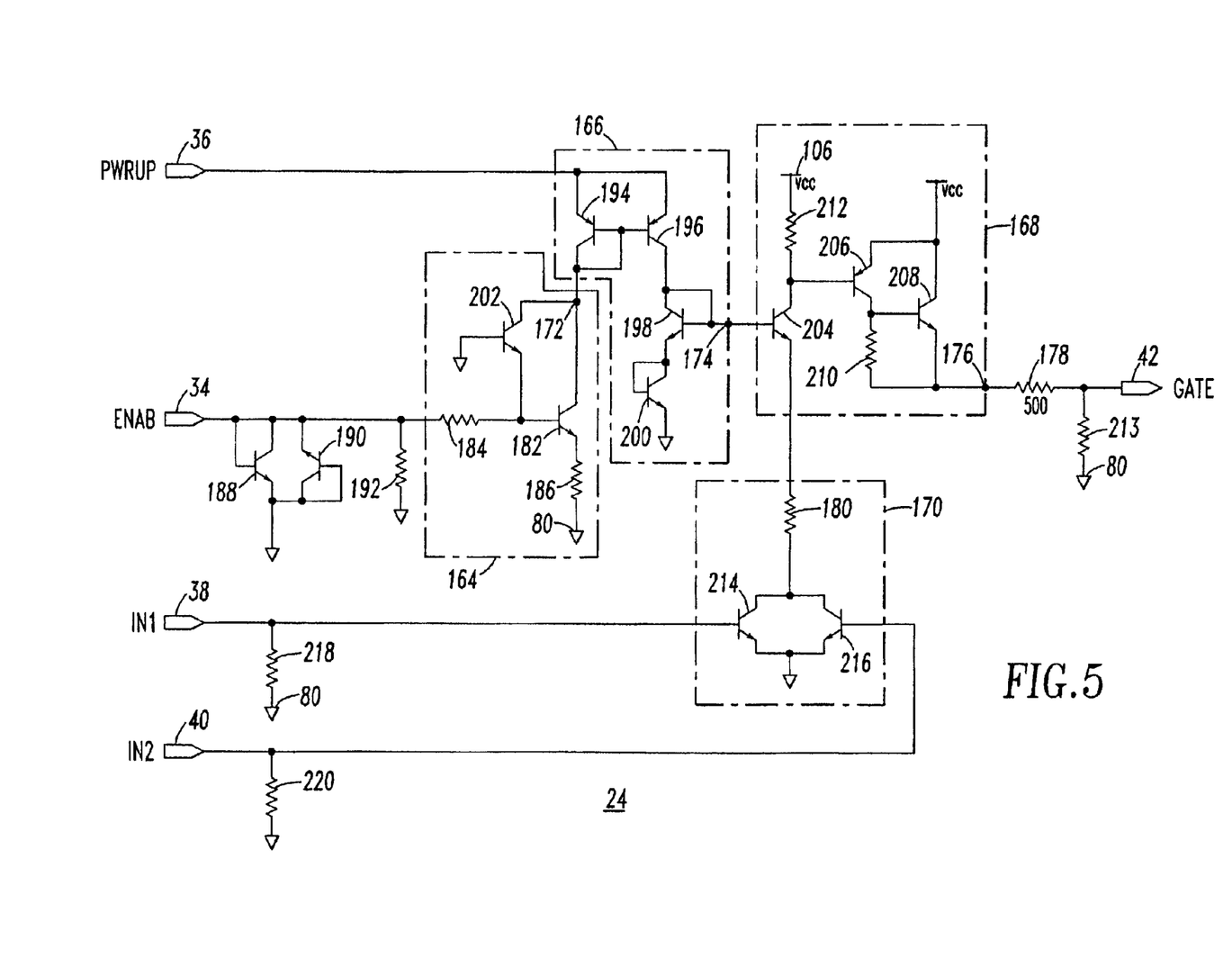
FIG. 5 is a block diagram, in schematic form, of the trip logic of FIG. 3.

Referring to FIGS. 2A–2B and 3, a trip unit 22 includes a trip logic circuit 24 (as best shown in FIGS. 3–5) that is incorporated in the bipolar arc fault/ground fault ASIC circuit 20. The ASIC 20 inexpensively provides suitable gate current in response to one of two trip requests 26 (e.g., arc fault trip, "ARC_TR") and 28 (e.g., ground fault trip, "GR_TR") when a triac 30 (or SCR 32 of FIG. 8) is in the OFF state with a suitable supporting voltage and when the ASIC 20 is suitably powered. The trip unit 22 is for operation with a circuit interrupter 23, such as an arc fault or ground fault circuit breaker.

Figure 9:
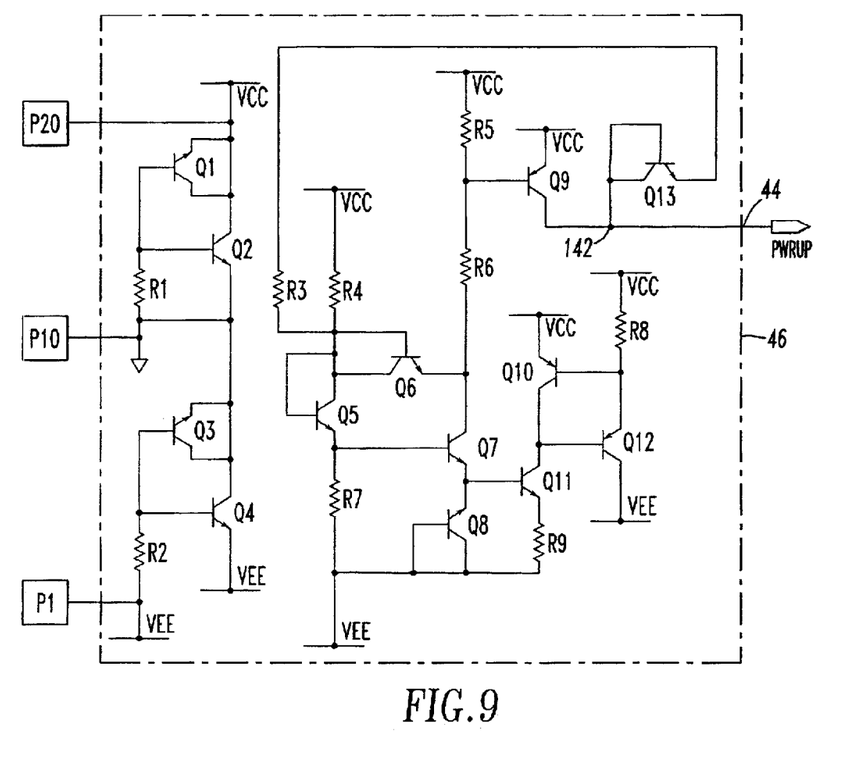
FIG. 9 is a block diagram, in schematic form, of the power supply monitoring sub-circuit of FIG. 3.

As shown in FIG. 3, the trip logic circuit or trip signal generator circuit 24 has four inputs (i.e., "ENAB" 34, "PWRUP" 36, "IN1" 38 and "IN2" 40) and one output (i.e., "GATE" 42). The exemplary pin numbers (P1–P20) of the ASIC 20 are shown in square boxes in FIG. 3 and correspond to the same pin numbers of the ASIC 20 of FIG. 2A. The "ENAB" input 34 functions as an enable input for a power up signal 44 to the "PWRUP" input 36 from a power supply monitoring sub-circuit (PWR) 46. FIG. 9 shows an example of the sub-circuit 46. If the ASIC 20 is fully powered up and is operational, then the power up signal 44 is generated by the sub-circuit (PWR) 46.

In FIG. 9, there are 13 transistors (Q1–Q13) and nine resistors (R1–R9). Transistors Q1, Q2 and resistor R1 form a shunt voltage regulator. The base-emitter junction of Q1 is employed in the reverse voltage direction to form a 6.3 V zener diode. When Q1 base current causes the voltage across R1 to turn on Q2, at about 0.7 V, Q2 shunts excess current from VCC to circuit ground, thereby regulating VCC at about +7.0 VDC.

Transistors Q3, Q4 and resistor R2 form another shunt voltage regulator. The base-emitter junction of Q3 is employed in the reverse voltage direction to form a 6.3 V zener diode. When Q3 base current causes the voltage across R2 to turn on Q4, at about 0.7 V, Q4 shunts excess VEE current to circuit ground, thereby regulating VEE at about −7.0 VDC.

The transistor Q8 reverse base-emitter junction voltage is employed as a voltage reference to determine when the VCC and VEE power supplies are near regulation. When VCC and VEE are near regulation, transistor Q7 is switched on by R4 current into Q7 base. With Q7 on, R5,R6 current is conducted through Q7 collector to emitter and Q8 emitter to base-collector. Resistor R6 current flows out of transistor Q9 base, turning Q9 on and producing an active "PWRUP" voltage signal.

Transistor Q11 emitter and resistor R9 convert the Q8 reference reverse voltage, at Q11 base, into a Q11 collector current. Transistor Q10 and Q12 convert the Q11 current into a buffered base-emitter voltage for use in generating internal current sources for the ASIC 20.

As shown in FIG. 2B, an external resistor 48, $R_1$, converts the voltage across the trip device (e.g., the triac 30, the SCR 32 of FIG. 8) into a current signal 50. The trip signal generator "ENAB" input 34 is electrically interconnected with the anode 88 of the triac 30 by the resistor 48. In the exemplary embodiment, if the value of this current signal 50 is greater than a suitable value (e.g., about 100 $\mu$A), which indicates that the trip device is off, then the power up signal 44 is enabled as discussed below in connection with FIG. 5.

In turn, the "PWRUP" input 36 functions as an enable for the trip output signal 52 from the trip signal generator GATE output 42. The two signals 44,50 in combination with one of the trip input request signals 26 and 28 for the respective "IN1" input 38 (arc fault) and the "IN2" input 40 (ground fault) produce the trip output signal 52 for the trip signal generator "GATE" output 42.

The trip signal generator output 42 is electrically interconnected with the gate 53 of the triac 30 by an external resistor 54, $R_2$ (e.g., without limitation, about 100 Ω). The output 42 sources a suitable gate drive current level (e.g., at least about 5 mA for the triac 30) to the triac gate 53 through the resistor 54.

As is conventional, the trip unit 22 includes a suitable trip actuator, such as trip solenoid 56, having a trip coil 58 for tripping open the operating mechanism 60 and separable contacts 62 of the circuit interrupter 23. The trip unit 22 and circuit interrupter 23 include a first conductive path 64 disposed between a line terminal 66 and a load terminal 68. The separable contacts 62 of the circuit interrupter 23 are electrically connected in series with a suitable shunt 70 (e.g., a bimetal; a conductor having a suitable resistance) between the terminals 66,68. The trip unit 22 and circuit interrupter 23 also include a second conductive path 72 disposed between a neutral terminal 74 and a load neutral terminal 76. A first node 78 of the shunt 70 defines a local ground 80 for the ASIC 20. A second node 82 of the shunt 70 is employed to sense the arc fault current in the first conductive path 64. The second conductive path 72 defines a node 84 (W), which is employed to power the trip solenoid trip coil 58. The triac 30 (or SCR 32 of FIG. 8) drives the trip coil 58. The cathode 86 of the triac 30 is electrically connected to the local ground 80 and the triac anode 88 is electrically connected to the resistor 48 and the trip coil 58. The series combination of the trip coil 58 and the triac 30 is electrically connected between the node 84 and the local ground 80.

The trip unit 22 further includes a power supply 90, a first interface circuit 92, a second interface circuit 94, and a test selection circuit 96. The power supply 90 includes an input 98 with an AC voltage 100 with respect to the local ground 80 and further includes two outputs 102 and 104 with respective +7 VDC 106 and −7 VDC 108 voltages. The first interface circuit 92 interfaces the voltage between the shunt nodes 78,82 and an arc fault detection circuit (ARC_DET 110 shown in FIG. 3). The second interface circuit 94 includes two current transformers 112,114 and interfaces to a ground fault detection circuit (GFI 116 shown in FIG. 3) and a dimmer detection circuit (DIM_DET 118 shown in FIG. 3). The circuit 118 is preferably employed to disable the arc fault detection circuit 110 upon detection of a transient associated with cold turn-on of an incandescent bulb powered by a dimmer.

The test selection circuit 96 includes a three-position (i.e., inactive, arc fault test, ground fault test) test button 120 having a common terminal 122 and two output terminals 124,126. The common terminal 122 is electrically connected to the power supply input 98 to receive the AC voltage 100. Normally, the common terminal 122 is electrically disconnected from the two output terminals 124,126. However, the test button 120 may be actuated from a central inactive position to a first actuated position (not shown), in order to electrically connect the common terminal 122 and the first output terminal 124. In this position, the AC voltage 100 is applied through RC filter 128 and resistor 129 to an input (TEST) 130 of an arc fault test signal generator circuit 132 (ARCTST of FIG. 3). In response to the filtered AC voltage, the circuit 132 generates a suitable arc fault test signal 133 for input by input 134 of the first interface circuit 92. The test button 120 may also be actuated from the inactive central position to a second actuated position (not shown), in order to electrically connect the common terminal 122 and the second output terminal 126. In this position, the AC voltage 100 is applied through resistor 136 to produce a suitable ground fault test current, which flows between the node 84 and the local ground 80 through the series combination of the trip coil 58 and the resistor 136 and through the openings of the current transformers 112,114, in order to simulate ground fault current on one of the conductive paths 64,72.

FIG. 3 shows the ASIC 20 of FIG. 2A. The arc fault detection circuit (ARC_DET) 110 includes output (OUT) 138 having the arc fault detection signal (ARC_TR) 26 for input IN1 38 of the trip signal generator circuit (TRIP_LOGIC) 24. The ground fault detection circuit (GFI) 116 includes output (TRIP) 140 having the ground fault detection signal 28 for input IN2 40 of the trip signal generator circuit 24. The ASIC 20 also includes the power supply monitoring sub-circuit (PWR) 46, which inputs and monitors the voltages 106,108 and local ground 80 of the power supply 90 of FIG. 2B and outputs the power up signal 44 (e.g., which indicates that the ASIC 20 is fully powered up and is operational) from output (PWRUP) 142 to the input (PWRUP) 36 of the trip signal generator circuit 24.

FIG. 4 shows a simplified block diagram of the trip signal generator circuit 24 of FIGS. 3 and 5. The trip signal generator circuit 24 includes the four inputs 34,36,38,40 and one output 42. The inputs 38,40 are electrically interconnected with the outputs 138,140 of the arc fault and ground fault detection circuits 110,116, respectively, of FIG. 3. The input 34 is electrically interconnected with the anode 88 of the triac 30 of FIG. 2B. The trip signal generator circuit 24 further includes a power up enable circuit 144, a voltage detection circuit 146 and a trip request detection circuit 148 having outputs 150, 152 and 154, respectively. A three-input AND function 156 has inputs 158,160,162, which are electrically connected to the outputs 150,152,154, respectively. The AND function 156 has the output 42 with the output signal 52.

FIG. 5 shows the trip signal generator circuit 24, which includes a first switch 164, a second switch 166, a third switch 168, and a pair of fourth switches 170. Although two fourth switches 170 are shown for the two inputs 38,40, as discussed below in connection with FIGS. 6 and 7, only one of those switches may be employed for a single arc fault or ground fault detection circuit. The first switch 164 includes an output 172 controlled by the input 34, which is electrically interconnected with the anode 88 of the triac 30 of FIG. 3 by the resistor 48. The second switch 166 includes an output 174 controlled by the output 172 of the first switch 164 and powered from the input 36, which is electrically connected to the output 142 of the power supply monitoring sub-circuit (PWR) 46. The third switch 168 includes an output 176 controlled by the output 174 of the second switch 166 and powered from the voltage 106 of the output 102 of the power supply 90 of FIG. 2B. The output 176 is electrically interconnected with the gate 53 of the triac 30 by the series combination of the internal resistor 178 (e.g., without limitation, about 500 Ω) and the external resistor 54 of FIG. 2B. The fourth switches 170 are controlled by the inputs 38,40, which are electrically interconnected with the outputs 138,140 of the arc fault and ground fault detection circuits 110,116, respectively, of FIG. 3. The fourth switches 170, in turn, enable the third switch 168 through the resistor 180.

The first switch 164 includes two NPN transistors 182 and 202, and two resistors 184,186. The base of the transistor 182 and the emitter of transistor 202 are electrically interconnected with the anode 88 of the triac 30 by the external resistor 48 of FIG. 2B and the internal resistor 184. The emitter of the transistor 182 is electrically interconnected with the cathode 86 of the triac 30 by the internal resistor 186. The base of transistor 202 is electrically connected to the cathode 86 of the triac 30. The collectors of the transistors 182 and 202 form the output 172 to control the second switch 166. A pair of NPN transistors 188 and 190 function as diodes to limit the positive or negative voltage at the input 34. A resistor 192 biases the transistor 182 to be normally off.

The second switch 166 includes four transistors 194,196, 198,200. The base and collector of the PNP transistor 194 are electrically interconnected with the output 172 of the first switch 164. The emitter of the transistor 194 is powered from the input 36. The base and emitter of the PNP transistor 196 are electrically interconnected with the respective base and emitter of the transistor 194. The base and collector of the NPN transistor 198 are electrically interconnected with the collector of transistor 196. The base and collector of the NPN transistor 200 are electrically interconnected with the emitter of the transistor 198. In turn, the collector of the transistor 196 controls the third switch 168.

The third switch 168 includes three transistors 204,206, 208 and two resistors 210,212. The base of transistor 204 is electrically interconnected with the output 174 of the second switch 166. The emitter of the transistor 204 is enabled by the fourth switch 170 through the resistor 180. The collector of the transistor 204 is powered through the resistor 212 from the output 102 of the power supply 90 of FIG. 2B. The base of the transistor 206 is electrically interconnected with the collector of the transistor 204. The emitter of the transistor 206 is powered from the power supply output 102. The base of transistor 208 is electrically interconnected with the collector of the transistor 206. The collector of the transistor 208 is powered from the power supply output 102. The emitter of the transistor 208 is electrically interconnected with the gate 53 of the triac 30 of FIG. 2B by the series combination of the internal resistor 178 and the external resistor 54, which is selected to suitably drive the triac gate 53. A resistor 213 is employed to normally bias the output 42 and the triac gate 53 with respect to the local ground 80.

The switches 170 include two transistors 214,216. The bases of the transistors 214,216 are electrically interconnected with the inputs 38,40 and the outputs 138,140 of the arc fault and ground fault detection circuits 110,116, respectively. The emitters of the transistors 214,216 are electrically interconnected with the triac cathode 86 and the local ground 80 of FIGS. 2A–2B. The collectors of the transistors 214,216 enable the third switch 168 through the resistor 180. Two base-emitter resistors 218,220 are employed to normally bias off the transistors 214,216.

The trip signal generator circuit 24 is structured for operation with an average current from the power supply 90 of FIG. 2B of less than about 2 mA.

Figure 6:
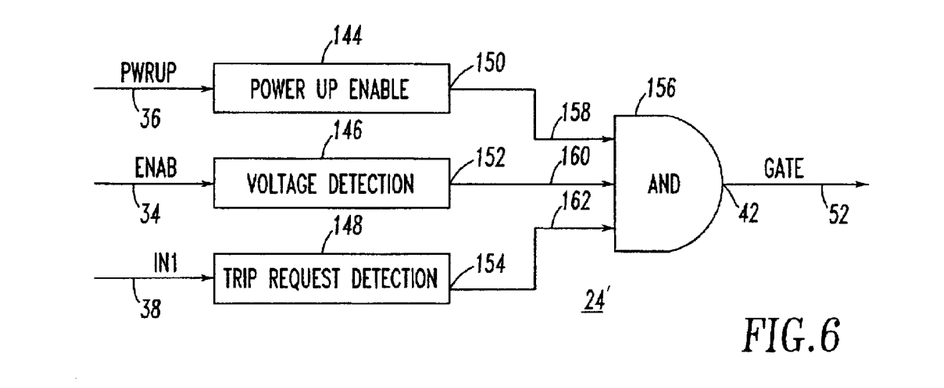
FIG. 6 is a block diagram of trip logic similar to the trip logic of FIG. 3, except employing a single input for the output of an arc fault detection circuit in accordance with another embodiment of the invention.

FIG. 6 shows a trip signal generator circuit 24', which is similar to the trip signal generator circuit 24 of FIGS. 3 and 4, except that it employs only one input IN1 38 of the two inputs 38,40, for the output 138 of the arc fault detection circuit 110.

Figure 7:
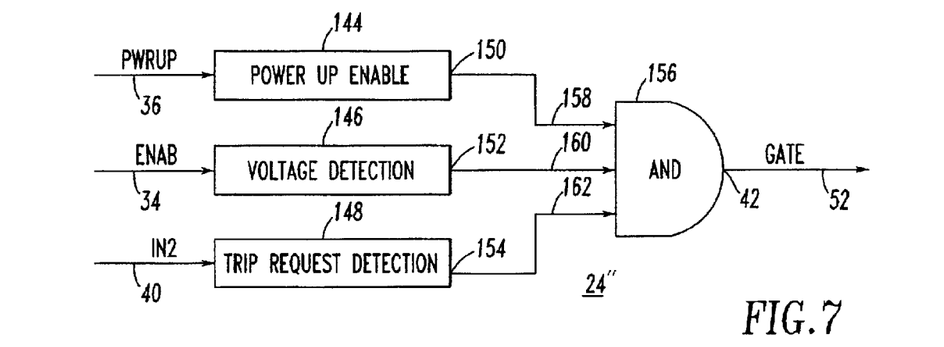
FIG. 7 is a block diagram of trip logic similar to the trip logic of FIG. 3, except employing a single input for the output of a ground fault detection circuit in accordance with another embodiment of the invention.

FIG. 7 shows a trip signal generator circuit 24", which is similar to the trip signal generator circuit 24 of FIGS. 3 and 4, except that it employs only one input IN2 40 of the two inputs 38,40, for the output 140 of the ground fault detection circuit 116.

Figure 8:
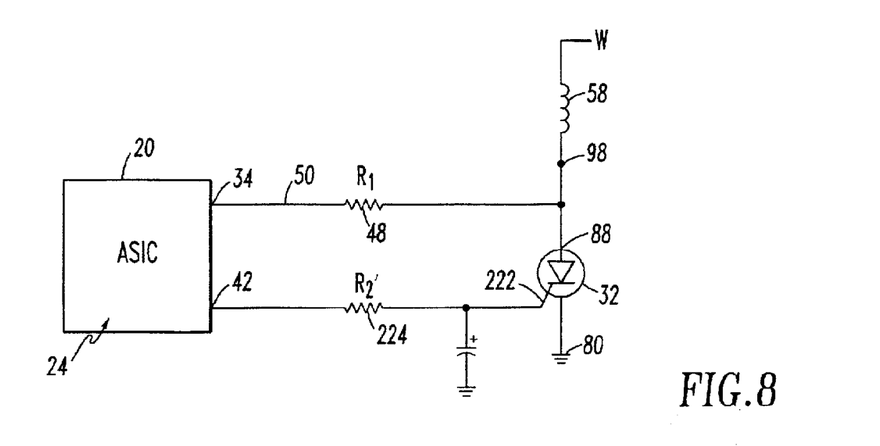
FIG. 8 is a block diagram of the integrated circuit of FIG. 3, which drives the gate of an SCR through a resistor in accordance with another embodiment of the invention.

FIG. 8 shows the ASIC 20 of FIG. 3, which drives the gate 222 of the SCR 32 through an external resistor 224, $R_2'$ (e.g., without limitation, about 10 KΩ). The output 42 of the ASIC 20 sources a current of at least about 200 μA to the SCR gate 222 through the resistor 224.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A trip unit for an arc fault or ground fault circuit breaker, said trip unit comprising:
   a trip actuator having a trip coil;
   a semiconductor switching device driving said trip coil, said semiconductor switching device including a gate and an output electrically interconnected with said trip coil;

an arc fault or ground fault detection circuit including at least one output having an arc fault or ground fault detection signal;
a power supply having an output; and
a trip signal generator comprising:
at least one first input electrically interconnected with said at least one output of said arc fault or ground fault detection circuit,
a second input electrically interconnected with said output of said semiconductor switching device,
a power supply monitor monitoring the output of said power supply, said power supply monitor having an output, and
a circuit having an output electrically interconnected with the gate of said semiconductor switching device, said circuit comprising:
a first switch controlled by said second input and electrically interconnected with said output of said semiconductor switching device, said first switch having an output,
a second switch controlled by the output of said first switch and powered from the output of said power supply monitor, said second switch having an output,
a third switch controlled by the output of said second switch, said third switch powered from the output of said power supply, said third switch having said output electrically interconnected with the gate of said semiconductor switching device, and
at least one fourth switch controlled by said at least one first input electrically interconnected with said at least one output of said arc fault or ground fault detection circuit, said at least one fourth switch enabling said third switch.

2. The trip unit of claim 1 wherein said arc fault or ground fault detection circuit includes a first output having an arc fault detection signal and a second output having a ground fault detection signal; and wherein said trip signal generator comprises two first inputs, with one of said first inputs electrically interconnected with said first output and with another one of said first inputs electrically interconnected with said second output.

3. The trip unit of claim 1 wherein said arc fault or ground fault detection circuit includes an output having an arc fault detection signal; and wherein said trip signal generator comprises one first input, which is electrically interconnected with said output having an arc fault detection signal.

4. The trip unit of claim 1 wherein said arc fault or ground fault detection circuit includes an output having a ground fault detection signal; and wherein said trip signal generator comprises one first input, which is electrically interconnected with said output having a ground fault detection signal.

5. The trip unit of claim 1 wherein said semiconductor switching device is a triac; and wherein said output of said circuit is electrically interconnected with said gate of said triac.

6. The trip unit of claim 5 wherein said output of said circuit is electrically interconnected with said gate of said triac by a resistor.

7. The trip unit of claim 6 wherein said output of said circuit sources a current of at least about 5 mA to said gate of said triac through said resistor.

8. The trip unit of claim 1 wherein said semiconductor switching device is an SCR; and wherein said output of said circuit is electrically interconnected with said gate of said SCR.

9. The trip unit of claim 8 wherein said output of said circuit is electrically interconnected with said gate of said SCR by a resistor.

10. The trip unit of claim 9 wherein said output of said circuit sources a current of at least about 200 $\mu$A to said gate of said SCR through said resistor.

11. The trip unit of claim 1 wherein said trip signal generator is an integrated circuit.

12. The trip unit of claim 1 wherein said integrated circuit is a bipolar integrated circuit.

13. The trip unit of claim 1 wherein said second input of said trip signal generator is electrically interconnected with said output of said semiconductor switching device by a resistor.

14. A trip signal generator for an arc fault or ground fault trip unit comprising a trip actuator having a trip coil, a semiconductor switching device driving said trip coil, said semiconductor switching device including a gate and an output electrically interconnected with said trip coil, an arc fault or ground fault detection circuit including at least one output having an arc fault or ground fault detection signal, and a power supply with an output, said trip signal generator comprising:
at least one first input electrically interconnected with said at least one output of said arc fault or ground fault detection circuit,
a second input electrically interconnected with said output of said semiconductor switching device,
a power supply monitor monitoring the output of said power supply, said power supply monitor having an output, and
a circuit having an output electrically interconnected with the gate of said semiconductor switching device, said circuit comprising:
a first switch controlled by said second input and electrically interconnected with said output of said semiconductor switching device, said first switch having an output,
a second switch controlled by the output of said first switch and powered from the output of said power supply monitor, said second switch having an output,
a third switch controlled by the output of said second switch, said third switch powered from the output of said power supply, said third switch having said output electrically interconnected with the gate of said semiconductor switching device, and
at least one fourth switch controlled by said at least one first input electrically interconnected with said at least one output of said arc fault or ground fault detection circuit, said at least one fourth switch enabling said third switch.

15. The trip signal generator of claim 14 wherein said at least one first input is two first inputs, with one of said first inputs structured to receive an arc fault detection signal, and with another one of said first inputs structured to receive a ground fault detection signal.

16. The trip signal generator of claim 14 wherein said at least one first input is one first input, which is adapted to receive an arc fault detection signal.

17. The trip signal generator of claim 14 wherein said at least one first input is one first input, which is adapted to receive a ground fault detection signal.

18. The trip signal generator of claim 14 wherein said trip signal generator is an integrated circuit.

19. The trip signal generator of claim 18 wherein said integrated circuit is a bipolar integrated circuit.

20. The trip signal generator of claim 14 wherein said semiconductor switching device further includes a cathode and an anode, which is the output of said semiconductor switching device; wherein said first switch is a transistor having a base, an emitter and a collector, said base being electrically interconnected with said anode of said semiconductor switching device by a first resistor, said emitter being electrically interconnected with said cathode of said semiconductor switching device by a second resistor, and said collector controlling said second switch.

21. The trip signal generator of claim 14 wherein said second switch includes a first transistor, a second transistor, a third transistor and a fourth transistor, said first transistor having a base, an emitter and a collector, said base being electrically interconnected with said collector and with the output of said first switch, said emitter being powered from the output of said power supply monitor, said second transistor having a base, an emitter and a collector, said base of said second transistor being electrically interconnected with the base of said first transistor, said emitter of said second transistor being electrically interconnected with the emitter of said first transistor, said third transistor having a base, an emitter and a collector, said base of said third transistor being electrically interconnected with said collectors of said second and third transistors, said fourth transistor having a base, an emitter and a collector, said base of said fourth transistor being electrically interconnected with said collector of said fourth transistor and said emitter of said third transistor, said collector of said second transistor controlling said third switch.

22. The trip signal generator of claim 14 wherein said third switch includes a first transistor, a second transistor and a third transistor, said first transistor having a base, an emitter and a collector, said base being electrically interconnected with the output of said second switch, said emitter being enabled by said fourth switch, said collector being powered from the output of said power supply, said second transistor having a base, an emitter and a collector, said base of said second transistor being electrically interconnected with the collector of said first transistor, said emitter of said second transistor being powered from the output of said power supply, said third transistor having a base, an emitter and a collector, said base of said third transistor being electrically interconnected with the collector of said second transistor, said collector of said third transistor being powered from the output of said power supply, said emitter of said third transistor being electrically interconnected with the gate of said semiconductor switching device by a resistor.

23. The trip signal generator of claim 22 wherein said semiconductor switching device is a triac; and wherein said resistor is selected to drive the gate of said triac.

24. The trip signal generator of claim 22 wherein said semiconductor switching device is an SCR; and wherein said resistor is selected to drive the gate of said SCR.

25. The trip signal generator of claim 14 wherein said semiconductor switching device further includes a cathode; and wherein said at least one fourth switch includes at least one transistor having a base, an emitter and a collector, said base being electrically interconnected with one of said at least one output of said arc fault or ground fault detection circuit, said emitter being electrically interconnected with said cathode of said semiconductor switching device, said collector enabling said third switch.

26. A trip signal generator for an arc fault or ground fault trip unit comprising a trip actuator driven by a semiconductor switching device having an anode and a gate, an arc fault or ground fault detection circuit including at least one output having an arc fault or ground fault detection signal, and a power supply with an output, said trip signal generator comprising:

at least one first input electrically interconnected with said at least one output of said arc fault or ground fault detection circuit;

a second input electrically interconnected with the anode of said semiconductor switching device;

means for monitoring the output of said power supply and providing an output when said output of said power supply is operational; and means for driving the gate of said semiconductor switching device when said output of said power supply is operational, when said at least one first input is active, and when said second input is inactive.

27. The trip signal generator of claim 26 wherein said semiconductor switching device is a triac; wherein said second input is structured for electrical interconnection with the anode of said triac; and wherein said means for driving the gate of said triac generates a gate drive signal of about 5 mA.

28. The trip signal generator of claim 27 wherein said trip signal generator is structured for operation with an average current from said power supply of less than about 2 mA.

29. The trip signal generator of claim 26 wherein said means for driving the gate of said semiconductor switching device comprises a first switch controlled by said second input and electrically interconnected with said anode of said semiconductor switching device, said first switch having an output; a second switch controlled by the output of said first switch and powered from the output of said means for monitoring, said second switch having an output; a third switch controlled by the output of said second switch, said third switch powered from the output of said power supply, said third switch having said output electrically interconnected with the gate of said semiconductor switching device; and at least one fourth switch controlled by said at least one first input electrically interconnected with said at least one output of said arc fault or ground fault detection circuit, said at least one fourth switch enabling said third switch.

* * * * *